(12) United States Patent
Worek et al.

(10) Patent No.: US 8,599,578 B2
(45) Date of Patent: Dec. 3, 2013

(54) MULTI-RESONANCE POWER SUPPLY WITH AN INTEGRAL QUALITY FACTOR

(75) Inventors: Cezary Worek, Cracow (PL); Slawomir Ligenza, Wolbrom (PL)

(73) Assignees: Akademia Gorniczo-Hutnicza Im. Stanislawa Staszica, Krakow (PL); Fideltronik Poland SP. Z. O.O., Sucha-Beskidzka (PL)

( * ) Notice: Subject to any disclaimer, the term of this patent is extended or adjusted under 35 U.S.C. 154(b) by 318 days.

(21) Appl. No.: 12/737,235

(22) PCT Filed: Jun. 3, 2009

(86) PCT No.: PCT/PL2009/000061
§ 371 (c)(1),
(2), (4) Date: Dec. 17, 2010

(87) PCT Pub. No.: WO2009/154489
PCT Pub. Date: Dec. 23, 2009

(65) Prior Publication Data
US 2011/0157932 A1     Jun. 30, 2011

(30) Foreign Application Priority Data
Jun. 20, 2008 (PL) .......................... 385472

(51) Int. Cl.
*H02M 3/335* (2006.01)
*H02H 7/122* (2006.01)
(52) U.S. Cl.
USPC ..................... 363/21.02; 363/56.01

(58) Field of Classification Search
USPC ........ 363/16, 17, 21.02, 56.01, 56.02, 97, 98, 363/131, 132, 50
See application file for complete search history.

(56) References Cited

U.S. PATENT DOCUMENTS

| | | | |
|---|---|---|---|
| 4,488,213 A | 12/1984 | Buikema | |
| 4,691,273 A | 9/1987 | Kuwata et al. | |
| 5,594,635 A * | 1/1997 | Gegner | 363/124 |
| 6,344,979 B1 | 2/2002 | Huang et al. | |
| 6,650,551 B1 | 11/2003 | Melgarejo | |
| 6,747,883 B2 | 6/2004 | Yasumura | |
| 6,917,531 B2 | 7/2005 | Scheel et al. | |
| 7,643,314 B2 * | 1/2010 | Sato | 363/21.02 |
| 7,696,733 B2 * | 4/2010 | Osaka | 323/267 |
| 8,125,158 B2 * | 2/2012 | Nishino et al. | 315/247 |
| 2006/0227577 A1 | 10/2006 | Horiuchi et al. | |

FOREIGN PATENT DOCUMENTS

| | | |
|---|---|---|
| EP | 0332436 | 9/1989 |
| GB | 2393336 | 3/2004 |
| JP | 06090567 | 3/1994 |
| JP | 2002199719 | 12/2002 |

\* cited by examiner

*Primary Examiner* — Matthew Nguyen
(74) *Attorney, Agent, or Firm* — Horst M. Kasper

(57) ABSTRACT

Subject of the invention is a multi-resonance power supply with integral quality factor limiter, designated for transformation of direct voltages, characterised by high immunity to overload and rapid load changes. The power supply has the (TS) isolating transformer, with its primary winding connected to the main (OR) resonant circuit having at least one node connected with the set of (K1), (K2) current switches, via the serial resonant circuit, whereby at least one component of the serial resonant circuit is connected to the (DON) diode voltage limiter.

4 Claims, 4 Drawing Sheets

US 8,599,578 B2

MULTI-RESONANCE POWER SUPPLY WITH AN INTEGRAL QUALITY FACTOR

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention.

The subject of the invention is a multi-resonance power supply with an integral quality factor limiter, designed for DC-DC voltage transformation, characterised by high immunity to overload and rapid load changes.

Present-day DC-DC power converters are required to have high reliability, energy efficiency, compact overall dimensions and a low level of radio frequency interference. Such requirements are collectively met by switch-mode power supplies utilizing the resonance phenomenon. Current resonance allows easy control of output power level, whereas voltage resonance allows minimization of undesired phenomena occurring in transient states during the switching process. With the use of voltage resonance, the switching process can be performed at the time instants when the circuit current and voltage values are at their minimum levels and, consequently, allows minimization of switching losses.

(2) Description of Related Art including information disclosed under 37 CFR 1.97 and 1.98.

A resonance converter designed for operation with an inverter described in the US patent: US 2006/0227577 is known. The converter allows transformation of fluctuating and relatively low voltages obtained from renewable sources of energy to the level required by inverters connected to a power supply network. The converter comprises a parallel resonant circuit to which energy is delivered from a low-voltage source via current switches. The DC/AC conversion process is performed thanks to the employment of the zero-voltage switching method. A high frequency transformer, having its primary winding connected to a parallel resonant circuit, provides electrical isolation and generates high output voltage. The secondary winding of the said transformer is connected to a rectifier with a current, serial resonance circuit. The converter supplies output of 450 V at 25-30% voltage fluctuations.

The converter structure is sensitive to rapid load variations. If the load is suddenly disconnected at the maximum output power, the energy accumulated in the resonant circuit, being as a rule considerably higher than that transferred to the load during a single commutation period, may cause a current flow in the commutation circuit exceeding limit values.

(g) BRIEF SUMMARY OF THE INVENTION

The subject of the invention is a multi-resonance power supply with an integral quality factor limiter in which the main resonance circuit, comprising its first inductive reactance component and first capacitive reactance component, is connected to the primary winding of the isolating transformer. One of the nodes of the main resonant circuit is connected via an additional reactance component to the common node of diodes connection constituting a diode voltage limiter. The common node connecting diodes with the serial resonant circuit, consisting of a second inductive reactance component and second capacitive reactance component, is connected with a set of current switches. Capacitive reactance components are connected in parallel to the current switches. The second node of the resonant circuit is connected to the common point of blocking capacitors.

In a version of the multi-resonance power supply with an integral quality factor limiter, the main resonant circuit comprises its first inductive reactance component and first capacitive reactance component, whereby the first inductive reactance component constitutes an integral part of the isolating transformer. One of the nodes of the main resonance circuit is connected via an additional reactance component to the common node of diodes connection which constitutes a diode voltage limiter. The common node connecting the diodes with the serial resonant circuit, consisting of a second inductive reactance component and second capacitive reactance component, is connected with a set of current switches. Capacitive reactance components are connected in parallel to the current switches. The second node of the resonant circuit is connected to the common point of blocking capacitors.

In another version of the multi-resonance power supply with an integral quality factor limiter, the main resonant circuit, comprising its first inductive reactance component and first capacitive reactance component, is connected to the primary winding of the isolating transformer. Both nodes of the main resonant circuit are connected via additional reactance components with nodes of diode voltage limiters. Nodes of diode voltage limiters are connected with sets of current switches via serial resonant circuits, each of them comprising a second inductive reactance component and second capacitive reactance component. Capacitive reactance components are connected in parallel to all current switches.

In the next version of the multi-resonance power supply with an integral quality factor limiter, the main resonant circuit comprises its first inductive reactance component and first capacitive reactance component. The first inductive reactance component constitutes an integral part of the isolating transformer. Both nodes of the main resonant circuit are connected via additional reactance components with nodes of diode voltage limiters. Nodes of diode voltage limiters are connected to sets of current switches via serial resonant circuits, each of them comprising a second inductive reactance component and second capacitive reactance component. Capacitive reactance components are connected in parallel to all current switches.

(h) BRIEF DESCRIPTION OF THE SEVERAL VIEWS OF THE DRAWING(S).

Figure 1:
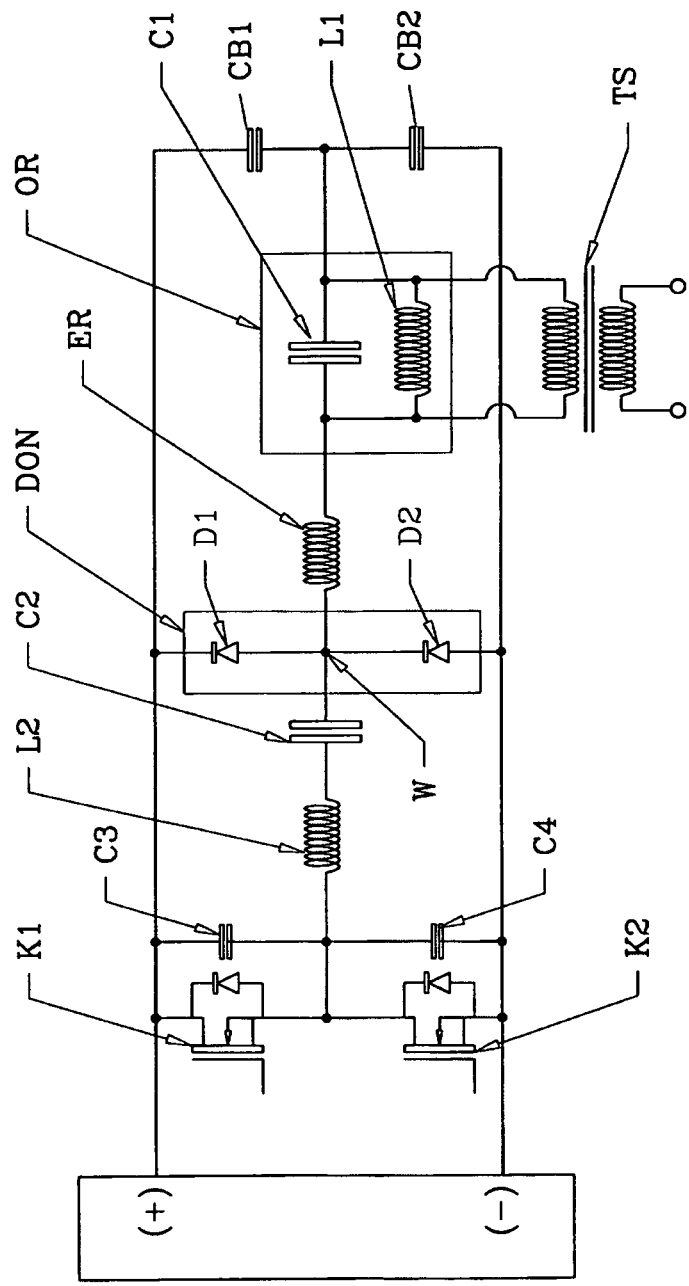
FIG. 1 shows a half-bridge structure of the resonance power supply, with an integral quality factor limiter.

(i) DETAILED DESCRIPTION OF THE INVENTION.

The multi-resonance power supply with an integral quality factor limiter comprises the main OR resonant circuit composed of an L1 inductive component and a C1 capacitor. The main OR resonant circuit is connected in parallel to terminals of the primary winding of the TS isolating transformer, which is intended to transform the voltage and isolate the output circuit. Sinusoidal voltage oscillations in the main OR resonant circuit are possible on condition that the amount of energy accumulated in the circuit is several times greater than the energy delivered to the output during one period. The high quality factor results in peak values of the current in the circuit that are considerably higher than those required by the load.

Oscillations in the main OR resonant circuit are maintained by a cyclic process of commutation of K1 and K2 current switches connected to a DC voltage source. Energy from the DC voltage source is transferred to the main OR resonant circuit via a serial resonant circuit comprising a C2 capacitor and an L2 inductance, connected with an ER inductance. Since the impedance of a serial resonant circuit strongly depends on the frequency, it is possible to control the output power. The serial L2, C2 resonant circuit serves therefore as a controller of power delivered to the main OR resonant circuit, whereby the instantaneous value of the delivered power strongly depends on the operating frequency of the K1 and K2 current switches. On the other hand, the same two-terminal circuit, in connection with the main OR resonant circuit, acts as a voltage transformer. When appropriate values of reactance components are selected for both: the serial and the main resonant circuit, it is possible to achieve voltage transformation. The voltage peak values achieved thereby in the main OR resonant circuit may exceed several times the peak values of the voltage generated by the K1, K2 commutation circuit.

This condition, even though very favourable, is also dangerous for the circuit components since in the case when control is lost by the control circuit due to disturbances or transient states, the limit voltage and/or current values applicable to the components used, may be exceeded. In order to protect the resonant circuit from self-destruction, the DON diode voltage limiter is applied, comprising D1 and D2 diodes connected, respectively, to the negative and positive poles of the main power supply circuit and connected to the serial resonant circuit. Thanks to the use of a DON diode voltage limiter, the voltage peak values at the W node do not exceed the limit values determined by the DC voltage source and the energy surplus from the main OR resonant circuit is returned to the DC voltage source.

An additional inductance ER component allows maintaining certain flexibility of the circuit. Despite the fact that the peak values of the voltage oscillation at the W node are limited to the level determined by the DC voltage source, the voltage transformability is maintained by combining the serial and the main OR resonant circuits. Thus, despite the application of the diode voltage limiter, the voltage oscillation amplitude in the main L1, C1 resonance circuit may exceed that at the W node. Furthermore, such configuration ensures proper operation of the voltage limiter also under the short-circuit condition of the TS isolating transformer winding. The voltage transformation coefficient is determined by selecting an inductance values ratio of the L2 and ER components. CB1, CB2 capacitors connected to one of the nodes of the main OR resonant circuit prevent a DC current component flow in the primary winding of the TS transformer. C3, C4 capacitors are intended to minimise energy loss in the K1, K2 current links during the commutation process.

It should be emphasised that precise control of output parameters of the power supply is achieved by means of a control system that has not been shown in the drawing. Using output parameters, the control circuit selects optimum parameters of control pulses for K1, K2 current switches. Due to the limited response time of the control system and a high switching frequency on the one hand, and a possible occurrence of the current and voltage critical values on the other hand, it is essential to use in resonance converters a separate, additional control circuit of high reliability and fast response. That function in the circuit according to the invention, is performed by the DON diode voltage limiter.

Figure 2:
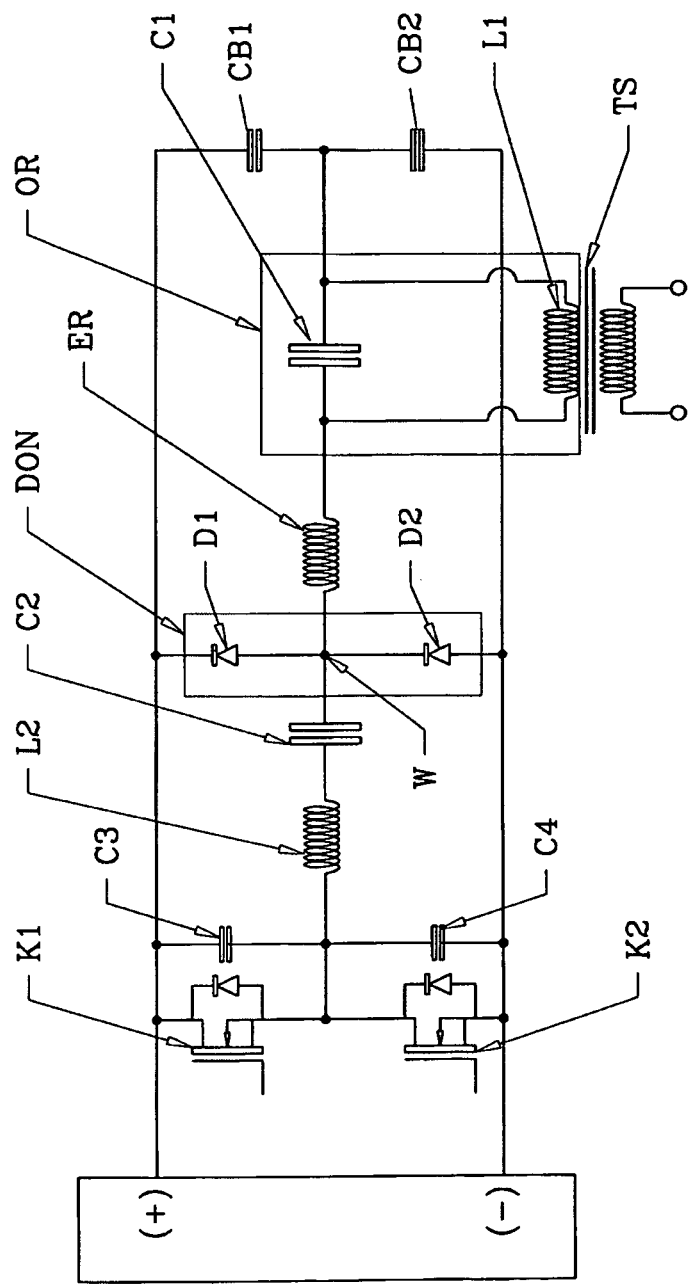
FIG. 2 shows a version of a half-bridge structure in which the L1 reactance component of the main OR resonant circuit is constituted by distributed inductance of the TS isolating transformer.

In the multi-resonance power supply shown in FIG. 2, the first L1 inductive reactance component constitutes an integral part of the TS isolating transformer. This version is intended for power supplies operating in a high frequency range (>300 kHz).

Figure 3:
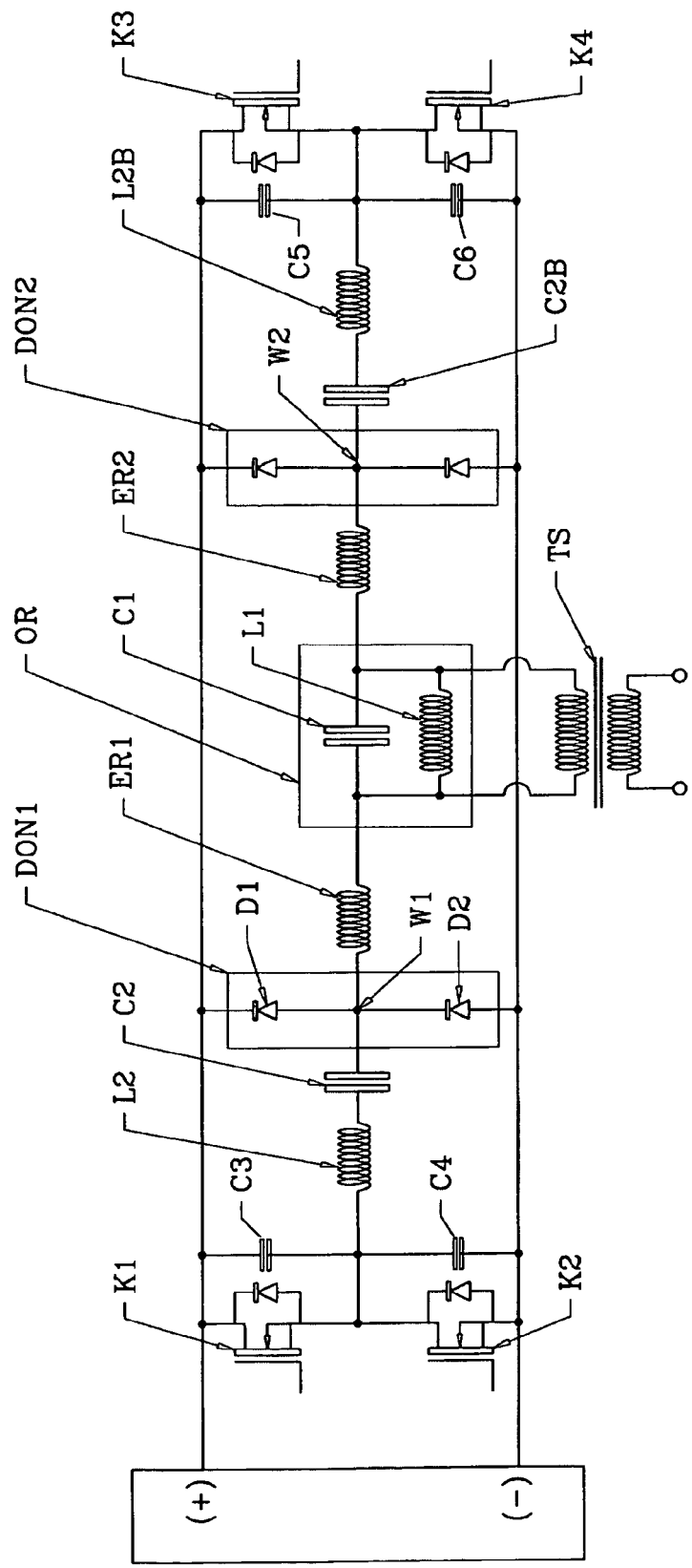
FIG. 3 shows a solution comprising a bridge structure of the resonance power supply with an integral quality factor limiter.

In the multi-resonance power supply presented in FIG. 3, a bridge structure of the commutation circuit has been applied. This version is designed for high capacity power supplies.

Figure 4:
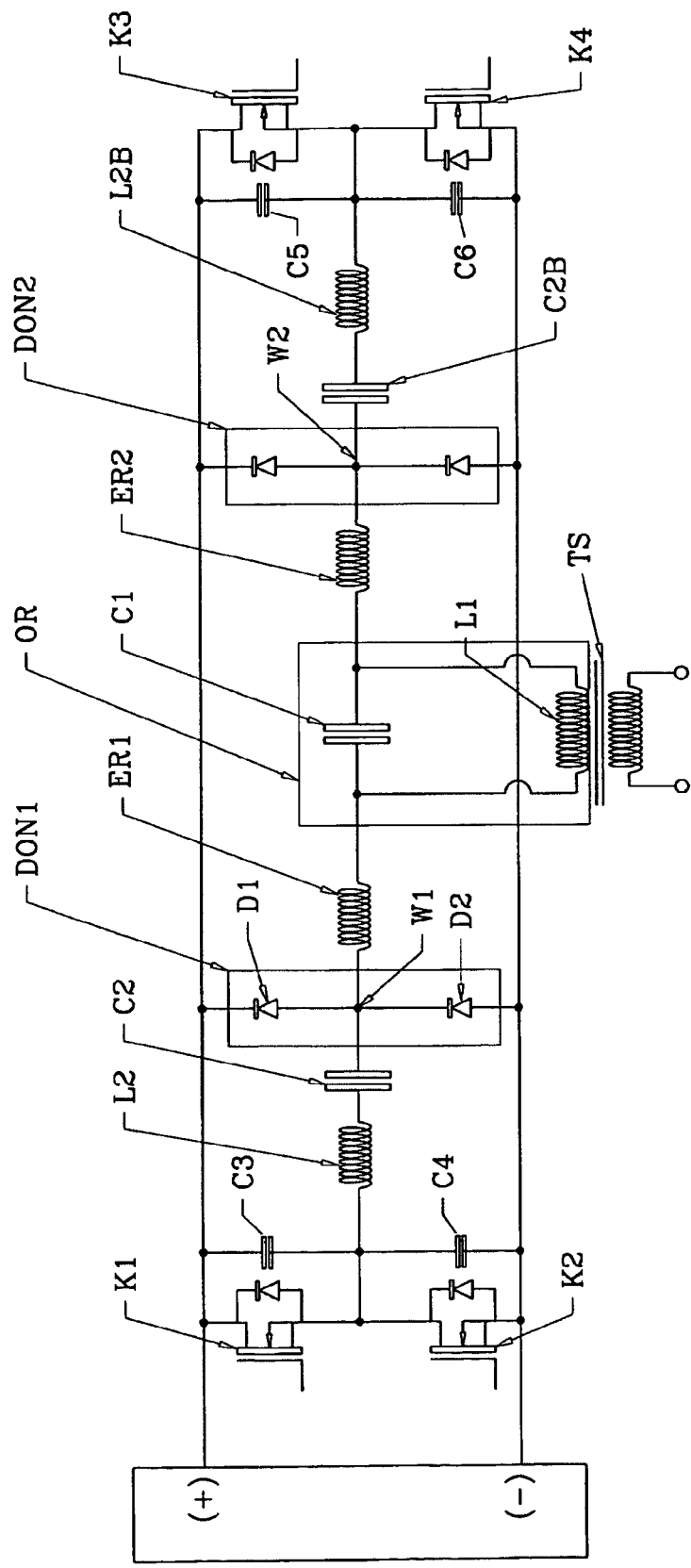
FIG. 4 shows a version of a bridge structure in which the L1 reactance component of the main OR resonant circuit is constituted by distributed inductance of the TS isolating transformer.

In the multi-resonance power supply version shown in FIG. 4, a bridge configuration of the commutation circuit is employed to ensure energy transfer to the main OR resonant circuit. The main OR resonant circuit comprises the L1 inductive reactance component which constitutes an integral part of the TS isolating transformer. This version is designed for power supplies operating in a high frequency range.

The structure of the multi-resonance power supply with an integral quality factor limiter, as described herein, exhibits high immunity to rapid load changes. Two-stage voltage transformation, where the first stage comprises a combination of a serial resonance circuit with the main parallel resonance circuit, to which the transformer being the second voltage transformation stage is connected, ensures great flexibility and ease of adaptation to various voltage levels at the converter input side.

Since most of the energy is accumulated in the main resonant circuit, which contains the minimum number of components, a careful design of that circuit, as well as its protection against energy loss due to radiation, allows minimization of power loss and of interference emission.

LIST OF SYMBOLS

Multi-Resonance Power Supply with an Integral Quality Factor Limiter

TS—isolating transformer,
OR—main resonant circuit,
L1, C1, L2, C2, C3, C4, C5, C6, CB1, CB2 L2B, C2B—reactance components,
ER, ER1, ER2—additional reactance components,
D1, D2—diodes,
DON, DON1, DON2—diode voltage limiters,
K1, K2, K3, K4—current switches,
W, W1, W2—nodes.

The invention claimed is:

1. A multi-resonance power supply with an integral quality factor limiter comprising at least one set of current switches, an isolating transformer and at least one resonant circuit characterised by having a main (OR) resonant circuit connected to a primary winding of the (TS) isolating transformer, the main (OR) resonant circuit composed of (L1), (C1) reactance components,
   whereby one of nodes of the main (OR) resonant circuit is connected via an additional (ER) reactance component—with a common W node of (D1), (D2) diodes constituting the (DON) diode voltage limiter, furthermore, a common (W) node connecting (D1), (D2) diodes via a serial resonant circuit composed of (L2), (C2) reactance components with a set of (K1), (K2) current switches, and to the set of (K1), (K2) current switches, reactance (C3) and (C4) components, respectively, are connected in parallel, whereby a second node of the main (OR) resonant circuit is connected to a blocking capacitors circuit composed of (CB1) and (CB2) reactance components.

2. A multi-resonance power supply with an integral quality factor limiter comprising at least one set of current switches, an isolating transformer and at least one resonant circuit characterised by having a (OR) resonant circuit composed of (L1), (Cl) reactance components, whereby the (L1) inductive reactance component constitutes an integral part of a (TS) isolating transformer, and a second node of a main (OR) resonant circuit is connected—via an additional (ER) reactance component to the common (W) node of (D1), (D2) diodes constituting the (DON) diode voltage limiter, furthermore, a common W node connecting (D1), (D2) diodes via a serial resonant circuit composed of (L2), (C2) reactance components with a set of (K1), (K2) current switches, and to the set of (K1), (K2) current switches, reactance (C3) and (C4) components are, respectively, connected in parallel, whereby the second node of the main (OR) resonant circuit is connected to blocking capacitors circuit composed of (CB1) and (CB2) reactance components.

3. A multi-resonance power supply with an integral quality factor limiter
   comprising at least one set of current switches, an isolating transformer and at least one resonant circuit characterised by having an (OR) resonant circuit
   connected to a primary winding of the (TS) isolating transformer, a main (OR) resonant circuit composed of (L1), (C1) reactance components, whereby
   both nodes of the main (OR) resonant circuit are connected—via (ER1) and (ER2) reactance components—with (W1) and (W2) nodes of the (DON1) and (DON2) diode voltage limiters, which are further connected to sets of (K1), (K2) and (K3), (K4) current switches, with resonant circuits composed, respectively, of (L2), (C2) and (L2B), (CB2) reactance components, whereby to (K1), (K2) current switches (C3) and (C4) components, respectively, have been connected in parallel and, to (K3), (K4) current switches, (C5) and (C6) components have been connected, respectively.

4. A multi-resonance power supply with an integral quality factor limiter
   comprising at least one set of current switches, an isolating transformer and at least one resonant circuit characterised by having a main (OR) resonant circuit composed of (L1), (Cl) reactance components, whereby the (L1) inductive reactance component constitutes an integral part of the (TS) isolating transformer, furthermore, both nodes of the main (OR) resonant circuit are
   connected—through (ER1) and (ER2) reactance components—with (W1) and (W2) nodes of the (DON1) and (DON2) diode voltage limiters, which are further connected to sets of (K1), (K2) and (K3), (K4) current switches, with resonant circuits composed, respectively, of (L2), (C2) and (L2B), (CB2)
   reactance components, whereby to (K1), (K2) current switches (C3) and (C4) components, respectively, have been connected in parallel and, to (K3), (K4) current switches, (C5) and (C6) components have been connected, respectively.

\* \* \* \* \*